INVENTORS
DONALD W. HOWARD
LESTER J. LARSEN

BY William G. Christoforo
ATTORNEY

United States Patent Office 3,535,004
Patented Oct. 20, 1970

3,535,004
MEANS RESPONSIVE TO ROAD SURFACE CONDITIONS FOR SELECTING ADAPTIVE BRAKING SYSTEM CONTROL CHANNEL CONTROLLING WHEEL
Donald W. Howard, South Bend, and Lester J. Larsen, Mishawaka, Ind., assignors to The Bendix Corporation, a corporation of Delaware
Filed Dec. 16, 1968, Ser. No. 784,134
Int. Cl. B60t 8/08
U.S. Cl. 303—21           9 Claims

ABSTRACT OF THE DISCLOSURE

In an adaptive braking system for automobiles, trucks and the like which utilize a control channel for a vehicle axle whose braking characteristics are to be controlled wherein the rotational velocity of each wheel on the controlled axis is sensed so as to generate electrical signals proportional to wheel velocity, an improvement is described comprising a means of selecting as control channel input either the electrical signal representing the higher velocity wheel or the electrical signal representing the lower velocity wheel. The wheel velocity signals are compared in a comparator to generate an error signal whenever these velocity signals differ by more than a predetermined percentage from one another. Known circuitry has as inputs both velocity signals and sorts these signals so as to provide at fixed relay contacts the high and low velocity signals. The error signal is applied to the relay winding so that the relay selects either the high or low velocity signal as control channel input.

CROSS REFERENCES TO RELATED APPLICATIONS

The present invention is an improvement particularly useful in adaptive braking systems of the type disclosed in patent application Ser. No. 712,672 for "Automotive Anti-Skid Control System" by Slavin et al., filed Mar. 13, 1968 and which is owned by the assignee of this application. Additionally, voltage sorting circuitry of the type required in this invention is described in the aforementioned patent application.

BACKGROUND OF THE INVENTION

This invention relates to adaptive braking control systems for automobiles, trucks and the like, and more particularly to an electronic control channel for such control systems of the type which simultaneously controls the braking characteristics of both wheels on a vehicle axis while selectively taking as input the velocity and acceleration characteristics of only one or the other of these wheels.

In the aforementioned patent application Ser. No. 712,672 there is described an adaptive braking system for wheeled vehicles which comprises basically a control channel for each wheel whose braking characteristics are to be controlled. This control channel receives as input, from the controlled wheel, an electrical signal proportional to wheel rotational velocity which is generated by a sensor mounted on or in close vicinity to the controlled wheel. This electrical velocity signal, briefly, is differentiated to obtain a deceleration signal which is applied to a comparator where it is compared with fixed reference levels which represent certain predetermined acceleration levels so as to generate error signals which can now be applied to electrical to mechanical transducers to control the braking pressure at the controlled wheel. There is also shown in this aforementioned application a modified control channel which can control the braking characteristics of two or more wheels, such as the two wheels on a single vehicle axle in accordance with the velocity signals received predeterminedly from either the most rapidly or the most slowly moving wheel. To accomplish this there is shown that a speed sensor is mounted on each wheel of the group to be controlled by the single control channel with the electrical velocity signals being combined in special select high or select low circuitry, which circuitry has been predetermined by the system designer in accordance with the type of adaptive braking characteristics desired from this control channel, to generate a single output which is either the high velocity or the low velocity signal as predetermined for this particular control channel.

By select high or select low circuitry is meant voltage sorting circuitry of the type which receives as inputs the electrical velocity signal from each wheel of the group to be controlled by a single control channel and allows only one of the electrical velocity signals to pass to an output terminal, the passed electrical velocity signal being either the signal generated by the faster or the slower moving wheel depending upon whether the voltage sorting circuitry is predeterminedly select high or select low respectively. The output terminal of the voltage sorting circuitry is connected to the control channel input terminal so that the selected electrical velocity signal will now determine the braking characteristics of the controlled wheel.

It has been discovered that in a vehicle which is equipped with a control channel for controlling both wheels of a single axis such as the control channel of the latter type described, wherein the velocity signal from the low speed wheel is selected as control channel input, that as long as the tire to road coefficients at both wheels are approximately equal, the stopping and steering characteristics of the vehicle for this type of control channel is optimized. However, where the tire to road coefficients are greatly unequal and the low velocity wheel is providing input for the control channel the stopping distance of the vehicle is greatly increased since the control channel in attempting to prevent the low velocity wheel from locking by attenuating its braking pressure also simultaneously and equally attenuates the braking pressure at the high velocity wheel, which is the wheel which should be performing, under these conditions, most of the vehicle braking. If the control channel had been designed to select the high velocity electrical signal as the control channel input and the two wheels were on greatly unequal coefficient surfaces, then it should be obvious that the wheel on the low coefficient surface, that is the low velocity wheel, will lock. However, since this wheel does little braking compared to the braking effect from the high velocity wheel the braking characteristics of the vehicle are optimized for this type of control system. Additionally, if the control channel is controlling the steering axle, vehicle steering will be only slightly effected as the rolling wheel (high velocity wheel) mainly controls the vehicle steering characteristics, while the skidding wheel (low velocity wheel) only slightly controls vehicle steering since it is on a very low coefficient surface with respect to the surface on which the high velocity wheel is rolling.

If, however, a vehicle equipped with a front (steering) axle control channel which selects the high velocity signal as channel input is braked on a surface wherein the tire to road surface coefficients are only slightly unequal, it is possible that the wheel on the lower coefficient surface will lock. Since, as has been assumed, the tire to road surface coefficients at the two wheels are only slightly unequal, the locked wheel will control the steering characteristics of the vehicle to an appreciable extent with resultant skewing of the vehicle in the direction of the skid and greatly impaired vehicle steering characteristics. It can thus be seen that an adaptive braking system utilizing a control channel which controls the braking characteristics of a vehicle axis in accordance with velocity signals received from only one of the axle wheels will have its braking characteristics optimized for this type of system only if the velocity signal chosen is chosen in accordance with the tire to road surface coefficients existing at the tire-road surface interface of the controlled wheels.

SUMMARY OF THE INVENTION

Accordingly, a means has been devised for selecting as input to a control channel for an adaptive braking system which controls both wheels on a vehicle axis either the high velocity or low velocity signal in accordance with the tire to road surface coefficients then existing in order to optimize vehicle braking characteristics. Wheel rotational speed of the two wheels on the axle whose braking characteristics are to be controlled is detected by wheel sensors located at the wheel, so as to generate electrical signals proportional to wheel rotational velocity. These electrical signals are combined in a select high circuit and in a select low circuit, such as the type described in the aforementioned patent application Ser. No. 712,672, so as to generate as outputs on first and second terminals respectively an electrical signal proportional to the rotational velocity of the high velocity wheel and an electrical signal proportional to the rotational velocity of the low velocity wheel. Additionally, the high velocity and low velocity signals are combined in a comparator to generate an error signal whenever the velocity difference therebetween exceeds a predetermined percentage. A relay switch normally selects as input for the control channel the electrical signal appearing on the second terminal, that is the electrical signal proportional to the rotational velocity of the low velocity wheel. The aforementioned error signal activates the relay so as to cause it to select as input for the control channel the electrical signal appearing on the first terminal, that is the electrical signal proportional to the rotational velocity of the high velocity wheel. Since in this type of adaptive braking system, both axle wheels are being braked by an equal force, that wheel which is on the lower coefficient road surface will slow down more rapidly with the difference in speed between the two wheels being dependent upon the difference in tire to road surface coefficient present at the two wheels. Thus, wheel speed difference is a measure of the difference of the frictional coefficients at the two wheels. The criteria that the comparator generate its error signal whenever the difference in velocity between the two wheels exceeds a predetermined percentage insures the control channel will change its mode of operation from select low to select high whenever the difference between the tire to road surface coefficients at the two wheels exceeds a predetermined amount. It is thus an object of this invention to provide a means for varying the input signal to an adaptive braking control channel of the type described in accordance with the tire to road surface coefficient upon which the vehicle is operating.

It is another object of this invention to provide an adaptive braking control channel of the type described having optimized braking and steering characteristics.

It is still another object of this invention to accomplish the above objects automatically without attention from the vehicle operator.

One further object of this invention is to provide a control channel input selecting means of the type described which is fully compatible with previously known adaptive braking systems.

These and other objects of this invention will become apparent to one skilled in the art by a reading and comprehension of the following description of the preferred embodiment and claims.

DESCRIPTION OF THE PREFERRED EMBODIMENT

Figure 1:
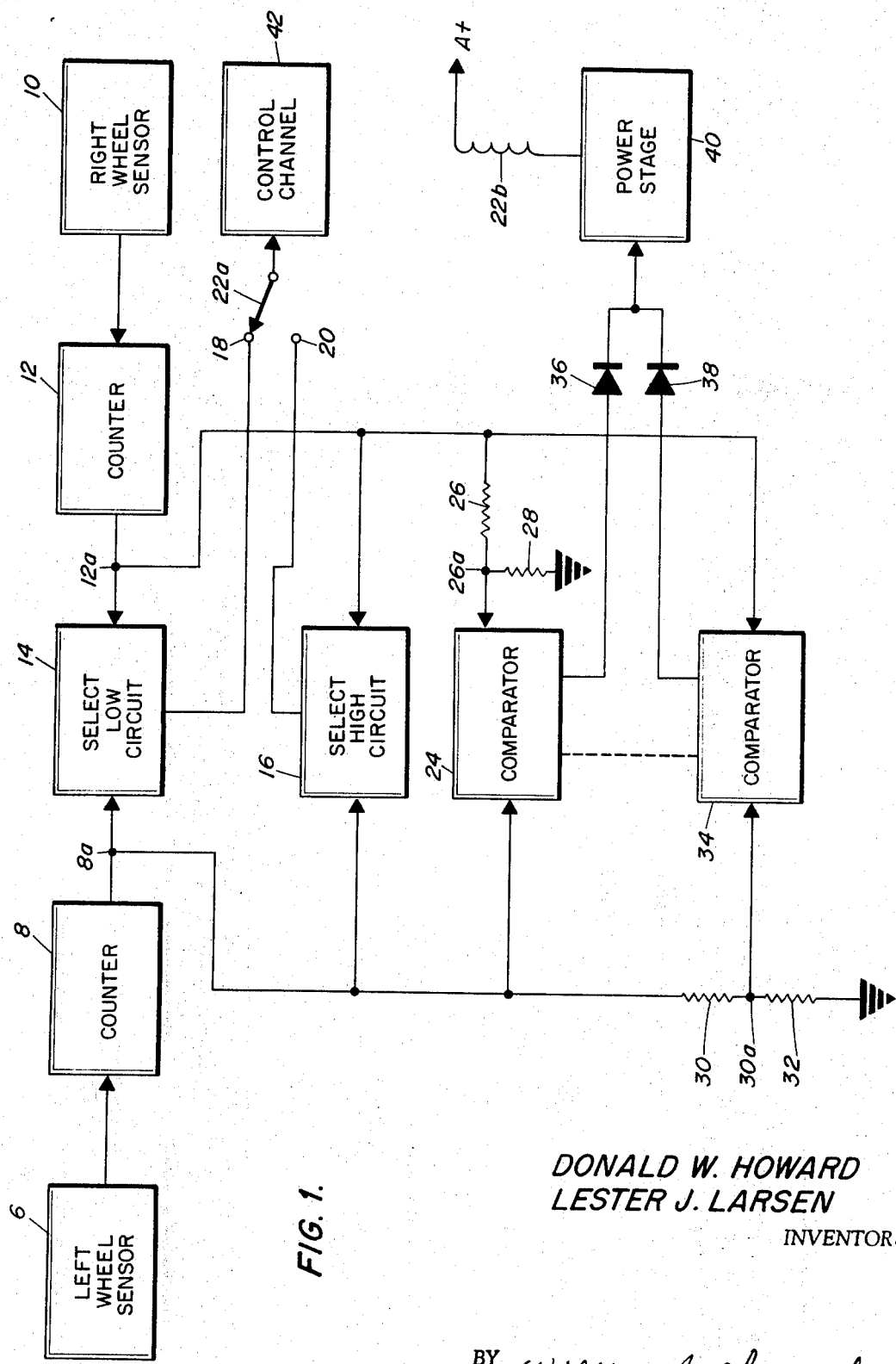
FIG. 1 is a block diagram of the invention.

Referring now to the drawings wherein like parts are indicated by life reference numbers throughout the figures and referring particularly to FIG. 1, left wheel sensor 6 and right wheel sensor 10 are located on and sense rotational speed of the left and right wheels respectively of an axle whose braking characteristics are to be controlled. The wheel sensors generate pulses at a rate linearly related to wheel velocity. The pulses are converted to a D.C. voltage level proportional to wheel speed in counters 8 and 12. Thus, there appears on terminals 8a and 12a D.C. voltage levels proportional to the rotational velocity of the left and right wheels respectively. The velocity voltage signals are applied to the select low circuit 14 and select high circuit 16 which sorts the signals so that the voltage signal generated by the low speed wheel always appears on terminal 18 and the voltage signal generated by the high speed wheel always appears on terminal 20. Comparator 24, which is suitably a differential amplifier, has applied thereto the left wheel voltage signal directly and the right wheel voltage signal attenuated by the voltage divider comprised of resistors 26 and 28, and generates an output through diode 36 to power stage 40 whenever the voltage on terminal 8a drops below the voltage on terminal 26a. In like manner, comparator 34, also suitably a differential amplifier, has applied thereto directly the voltage on terminal 12a and the voltage on terminal 8a as attenuated through the voltage divider comprised of resistors 30 and 32. This latter comparator generates an error signal which is applied through diode 38 to power stage 40 whenever the voltage on terminal 12a drops below the voltage on terminal 30a. It should now be obvious that with the elements of the circuit properly chosen power stage 40 will receive an input whenever the wheel speeds differ by an amount determined basically by the voltage division ratio of the voltage dividers comprised of resistors 26 and 28 and resistors 30 and 32.

When relay coil 22b is deenergized, relay pole 22a contacts and samples low speed signal terminal 18. Thus, when the wheel speeds are identical within a predetermined limit so that power stage 40 is generating no output control channel 42 receives as an input the low velocity voltage signal. However, when power stage 40 receives an error signal from either comparator 24 or 34 it generates an output which energizes input coil 22b from the A+ voltage source so that relay pole 22a contacts and samples high speed voltage terminal 20. Thus when the wheel speeds differ by a predetermined amount control channel 42 receives as input the high speed voltage signal.

Figure 2:
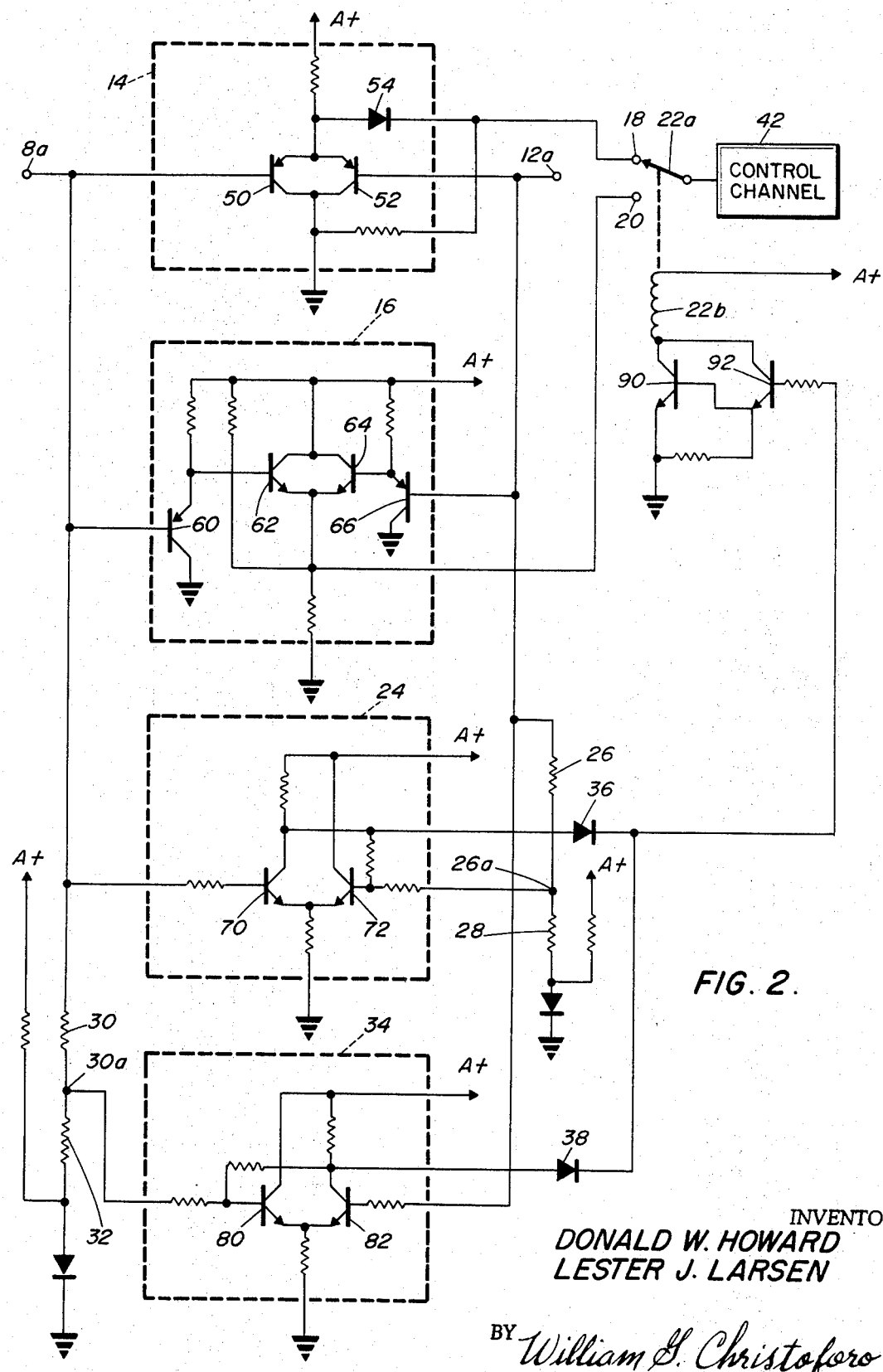
FIG. 2 is a schematic of the invention.

Referring now to FIG. 2, select low circuit 14 is seen to be comprised of a differential amplifier which is in turn comprised of transistors 50 and 52. The transistor, 50 or 52, is conductive which has the lower voltage applied to its base so that there always appears on the common emitter junction of these transistors a voltage equal to the low velocity signal less the transistor diode drop. The voltage drop across diode 54 is equal but opposite to the diode voltage drop of the conductive transistor so that there always appears on terminal 18 the low velocity signal voltage.

Select high circuit 16 is seen to be comprised of a differential amplifier which in turn is comprised of transistors 60, 62, 64 and 66. In this circuit transistors 62 and 64 are controlled respectively by transistors 60 and 66, so that when a higher voltage is applied to the base of the transistor 60, transistor 62 is conductive and the voltage signal appearing at its emitter is equal to the voltage at terminal 8a because of the equal but opposite voltage drops through the diodes of transistors 60 and 62. In like manner, if the voltage on terminal 12a exceeds the voltage on terminal 8a the higher voltage at terminal 12a will be reproduced at terminal 20. Thus, it can now be seen that there always appears on terminal 18 a voltage proportional to the speed of the slower wheel and there appears on terminal 20 a voltage proportional to the speed of the faster wheel.

Comparators 24 and 34 are seen to be identical to one another and to be comprised of differential amplifiers comprised respectively of transistors 70 and 72 and transistors 80 and 82. It can also be seen that the voltage on terminal 8a is applied directly to comparator 24 but is attenuated by the voltage divider comprised of resistors 30 and 32 before being applied to the comparator 34, while the voltage on terminal 12a is applied directly to comparator 34, but is attenuated by the voltage divider comprised of resistors 26 and 28 before being applied to comparator 24. In the case of comparator 24, the comparator output, that is the voltage on the collector of transistor 70, is depressed whenever terminal 8a voltage exceeds the voltage on terminal 26a, which is the time during which transistor 70 is conductive. If the voltage on terminal 8a drops below the voltage on terminal 26a transistor 70 becomes non-conductive and transistor 72 conducts so that the voltage on the collector of transistor 70 moves towards A+ source voltage which is thus applied through diode 36 to the amplifier comprised of transistors 90 and 92, which thereby become conductive thus energizing relay coil 22b. Relay pole 22a is urged to and now samples terminal 20, changing the input to control channel 42. In an identical manner relay coil 22b is energized whenever comparator 34 generates an output as would be the case should the voltage on terminal 12a drop below the voltage on terminal 30a.

It has been shown in this embodiment how the speed voltage signal input to a control channel which controls both wheels on an axis can be varied in accordance with the frictional coefficients existing at the tire-road interfaces of the various wheels in order to obtain optimized braking of the vehicle for this type of adaptive braking system. However, we do not wish to limit our invention to the specific embodiment shown but rather claim as our invention all changes and modifications thereof which fall within the true scope and spirit of the appended claims.

The invention claimed is:

1. In a wheeled vehicle having a wheel braking system whereby said vehicle wheels are braked by a braking force, an improved adaptive braking control channel for controlling said braking force on a predetermined grouping of said vehicle wheels in response to a selected electrical signal, and including means for generating a plurality of first electrical signals; each said first electrical signal being proportional to a predetermined measurable characteristic of a different one of said vehicle wheels in said predetermined wheel grouping, comprising:
   sorting circuitry responsive to said first electrical signals for sorting said first electrical signals in accordance with the magnitude thereof, onto predetermined output terminals;
   means responsive to said first electrical signals for generating error signals; and,
   means responsive to said error signals for sampling said output terminals, said sample comprising said control channel input selected electrical signal.

2. In a wheeled vehicle having a wheel braking system whereby said vehicle wheels are braked by a braking force to decelerate said vehicle, an improved adaptive braking control channel for controlling said braking force simultaneously on a first and second of said vehicle wheels in response to a selected electrical signal, and including means for generating a first electrical signal proportional to the rotational velocity of said first wheel and means for generating a second electrical signal proportional to the rotational velocity of said second wheel, said improvement being a control channel input selection means comprising:
   select low circuitry responsive to said first and second electrical signals for sorting said first and second electrical signals in accordance with a maximum and minimum of a predetermined measurable electrical quantity, whereby said electrical signal possessing the minimum of said electrical quantity is generated on a first output terminal;
   select high circuitry responsive to said first and second electrical signals for sorting said first and second electrical signals in accordance with a maximum and minimum of said predetermined measurable electrical quantity whereby said electrical signal possessing the maximum of said electrical quantity is generated on a second output terminal;
   comparator means responsive to said first and second electrical signals for generating a primary error signal whenever the ratio of either one of said electrical signals with the other of said electrical signals exceeds a predetermined amount; and,
   means responsive to said primary error signal for sampling said first and second terminals, said sample comprising said control channel input selected electrical signal.

3. Input selection means for an adaptive braking control channel as recited in claim 2 wherein said first and second electrical signals comprise d.c. voltage signals whose magnitude is proportional to the rotational velocity of said first and second wheels respectively and wherein:
   said select low circuitry comprises circuitry including said first terminal responsive to said first and second electrical signals for sorting said first and second electrical signals in accordance with their magnitudes whereby the minimum of said electrical signals is generated on said first terminals; and
   said select high circuitry comprises circuitry including said second terminal responsive to said first and second electrical signals for sorting said first and second electrical signals in accordance with their magnitudes whereby the maximum of said electrical signals is generated on said second terminal.

4. Input selection means for an adaptive braking control channel as recited in claim 3 wherein said comparator means comprises:
   a first voltage divider for dividing said first electrical signal;
   a second voltage divider for dividing said second electrical signal;
   a first comparator responsive to said first electrical signal and said divided second electrical signal for generating a first error signal;
   a second comparator responsive to said divided first electrical signal and said second electrical signal for generating a second error signal; and,
   means combining said first and second error signal for generating said primary error signal.

5. Input selection means for an adaptive braking control channel as recited in claim 3 wherein said select low circuitry comprises:
   first and second differentially connected emitter follower transistors having commonly connected emitter terminals and base terminals, said first electrical signal being connected to said first transistor base terminal and said second electrical signal being connected to said second transistor base terminal; and
   diode means connecting said commonly connected emitter terminal to said first terminal.

6. Input selection means for an adaptive braking control channel as recited in claim 5 wherein said diode means is connected back-to-back with the base-emitter circuits of said first and second emitter followers.

7. Input selection means for an adaptive braking control channel as recited in claim 3 wherein said select high circuitry comprises:
  a first emitter follower transistor having first base and emitter terminals, said first electrical signal being connected to said first base terminal;
  a second emitter follower transistor having second base and emitter terminals, said second electrical signal being connected to said second base terminal;
  third and fourth differentially connected emitter follower transistors having commonly connected emitter terminals and third and fourth base terminals respectively, said third base terminal being connected to said first emitter terminal and said fourth base terminal being connected to said second emitter terminal, said second terminal being connected to said commonly connected emitter terminals.

8. Input selection means as recited in claim 7 wherein said first and third emitter follower base-emitter circuits are connected back-to-back and said second and fourth emitter follower base-emitter circuits are connected back-to-back.

9. Input selection means for an adaptive braking control channel as recited in claim 4 wherein said first comparator comprises:
  a first transistor having base, emitter and collector terminals, said first electrical signal being connected to said first transistor base terminal and said first error signal being generated at said first transistor collector terminal;
  a second transistor having base, emitter and collector terminals, said divided second electrical signal being connected to said second transistor base terminal, and said first and second transistors being differentially connected; and wherein said second comparator comprises;
  a third transistor having base, emitter and collector terminals, said second electrical signal being connected to said third transistor base terminal and said second error signal being generated at said third transistor collector terminal; and
  a fourth transistor having base, emitter and collector terminals, said divided first electrical signal being connected to said fourth transistor base terminal, said third and fourth transistors being differentially connected.

References Cited
UNITED STATES PATENTS 3,398,994   8/1968   Smith.
3,398,995   8/1968   Martin.

DUANE A. REGER, Primary Examiner

U.S. Cl. X.R.

303—20